United States Patent [19]

Urban et al.

[11] 4,283,459
[45] Aug. 11, 1981

[54] INSULATING COMPOSITION AND ARTICLES MADE THEREFROM

[75] Inventors: Edward J. Urban, Kennett Square, Pa.; William P. Vitcusky, Newark, Del.

[73] Assignee: E. I. Du Pont de Nemours and Company, Wilmington, Del.

[21] Appl. No.: 65,095

[22] Filed: Aug. 9, 1979

[51] Int. Cl.³ ............................................. B32B 15/00
[52] U.S. Cl. ........................ 428/379; 174/110 PM; 174/110 SR; 174/120 SR; 428/372; 428/375; 428/389; 428/402; 525/240
[58] Field of Search .............. 428/379, 375, 378, 402, 428/372, 389; 174/110 PM, 110 SR, 120 SR; 525/240

[56] References Cited
U.S. PATENT DOCUMENTS

| | | | |
|---|---|---|---|
| 2,956,042 | 10/1960 | Underwood | 525/240 |
| 3,499,791 | 3/1970 | Maloney | 428/379 |
| 3,629,110 | 12/1971 | Hunt | 174/110 PM X |
| 3,645,929 | 2/1972 | Normanton | 525/240 X |
| 3,795,646 | 3/1974 | Thornley | 131/17 R |
| 3,893,957 | 7/1975 | Mixon et al. | 525/240 X |
| 3,956,420 | 5/1976 | Kato et al. | 525/100 |
| 4,013,622 | 3/1977 | DeJuneas et al. | 525/1 X |
| 4,144,202 | 3/1979 | Ashcraft et al. | 174/110 PM X |
| 4,206,260 | 6/1980 | McMahon | 174/110 PM |

FOREIGN PATENT DOCUMENTS 50-14348  5/1975  Japan .

Primary Examiner—Lorraine T. Kendell

[57] ABSTRACT

A composition is disclosed especially useful for high voltage electrical insulation comprising a blend of polyethylene, an alcohol of 6 to 24 carbons to prevent electrical failure, and polypropylene to mitigate exudation of the alcohol.

7 Claims, 1 Drawing Figure

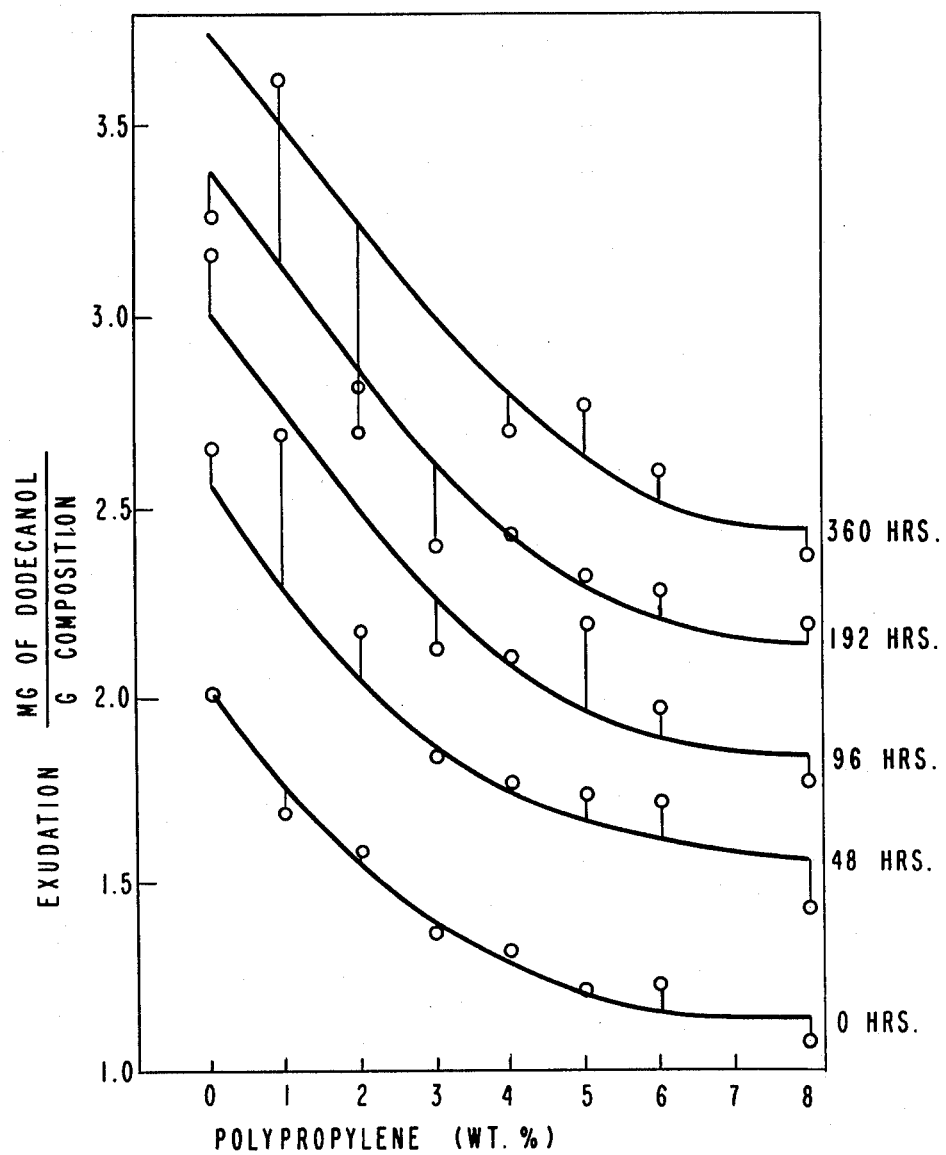

INSULATING COMPOSITION AND ARTICLES MADE THEREFROM

BACKGROUND OF THE INVENTION

1. Field of the Invention

This invention relates to electrical insulation especially useful as primary insulation in high voltage applications. The insulation is a composition of polyethylene combined with an additive which provides resistance to electrical breakdown and another component which mitigates exudation of the additive from the polyethylene.

Electrical breakdown of high voltage insulation, known as dielectric failure, is often initiated at the sites of voids and contaminating particles. Despite extreme care used in making, handling, and extruding polyethylene insulation, voids and contaminants can be introduced in any step prior to final shaping of the insulation to yield an insulated electrical cable. The breakdown of insulation in high voltage applications is known to the trade as electrical "treeing". Treeing is a relatively slow progressive degradation of an insulation composition caused by electron and ion bombardment of the insulation and resulting in the formation of microchannels or tubes having an overall tree-like appearance. Trees are initiated at locations of voids or contamination by the action of ionization (corona) during high voltage surges. Once initiated, trees usually grow, hastened by voltage surges, until such time as dielectric failure occurs.

To overcome the problem of treeing, various additives have been proposed, particularly for use in polyethylene or polyolefins, which additives serve to either prevent formation of trees or serve to delay tree growth. Certain alcohols have been found to be effective additives for delay of tree growth in polyethylene insulation. The alcohols, however, have a tendency to migrate to the surface of the polyethylene. The polyethylene insulation is often made and shipped as small pellets and stored for long periods of time in varying conditions before final extrusion operations to yield insulated electrical cables. The pellets, under certain storage conditions, agglomerate and clump due to the presence of the alcohol additive which has migrated to the surface of the pellets. While the beneficial effect of the alcohol additives in polyethylene insulation is important with regard to delay in tree growth, agglomeration of the polyethylene pellets causes difficulty in material handling which must be corrected.

2. Discussion of the Prior Art

Alcohols of 6 to 24 carbon atoms have been added to polyethylene to yield electrical insulation material having greatly reduced tendency for tree growth. U.S. Pat. No. 4,206,260 issued June 3, 1980, discloses a composition of alcohol and polyethylene and provides evidence of a more than thousand-fold increase in electrical endurance realized by use of an alcohol additive.

Other additives which have been proposed for polyethylene insulation to increase resistance to electrical breakdown include: an inorganic salt of a strong acid with a strong Zwitter-ion compound in U.S. Pat. No. 3,499,791; a ferrocene compound with a substituted quinoline compound in U.S. Pat. No. 3,956,420; silicone fluid in U.S. Pat. No. 3,795,646; and an aromatic ketone in Japanese Pat. No. 14348/75.

U.S. Pat. No. 3,795,646 also provides that polyethylene insulation can be blended with other materials including vinyl acetate, ethyl acrylate, propylene, and butene-1 as well as with copolymers such as ethylene-propylene copolymer. There is caution that the blend must include no less than 50 weight percent ethylene and, more generally, will include 70 to 90 percent.

SUMMARY OF THE INVENTION

This invention is directed to an insulating composition and to an article coated with such a composition wherein the composition consists essentially of polyethylene, an alcohol having 6 to 24 carbon atoms, and polypropylene. The polyethylene serves as an electrical insulator, the alcohol serves to inhibit tree growth, and the polypropylene serves to mitigate exudation of the alcohol from the polyethylene.

The composition of this invention can be in any form including a sheath of material surrounding and insulating an electrical conductor and a pelletized form of the material as it might be prior to use. The pelletized form of the material most advantageously demonstrates the benefit of the present invention. The polypropylene additive mitigates exudation of the alcohol additive from the polyethylene, thus decreasing surface effects which cause agglomeration and clumping in storage of pellets of the composition.

DETAILED DESCRIPTION OF THE INVENTION

A composition which has been found to be particularly useful as insulation for high voltage applications, such as in the primary insulation for transmission cable, includes polyethylene, crosslinked or not, and a higher alcohol which improves electrical endurance of the polyethylene. As previously noted, there is a tendency for the alcohol in that composition to migrate to the surface of the polyethylene and cause the surface to become slippery and wet with alcohol.

It has been discovered that migration of the alcohol is substantially reduced by addition of a small amount of polypropylene to the composition. It has also been discovered that such addition does not significantly affect the improved electrical endurance exhibited by the combination of polyethylene and alcohol alone.

The FIGURE is a graphical representation of the relationship between polypropylene concentration and exudation of alcohol additive as a function of time.

Accordingly, there is provided herein, a composition of matter consisting essentially of a homogeneous combination of polyethylene, a higher alcohol, and polypropylene in an amount effective to mitigate exudation of the alcohol from the polyethylene. The composition provided herein exhibits an electrical endurance much greater than the electrical endurance of polyethylene alone as determined by testing procedures hereinafter described and as described in U.S. Pat. No. 4,206,260.

As employed in the present specification, the term "polyethylene" means a homopolymer or copolymer containing no less than 85 weight percent ethylene polymerized units and no less than 95 weight percent of olefin polymerized units. These polymers would conform to the definition of "polyethylene plastics" defined in 1977 Annual Book of ASTM Standards, 1977, Part 36, page 72 as plastics based on polymers made with ethylene as essentially the sole monomer wherein essentially refers to no less than 85 weight percent ethylene and no less than 95 weight percent of total olefins. For use in this invention, polyethylene is low density polyethylene as defined hereinbelow. A preferred polyethylene contains about 100 weight percent ethylene polymerized units.

Suitable olefins which can be employed as comonomers include propylene, butene-1, hexene-1, octene-1 and decene-1. Other eligible comonomers include norbornene, butadiene, styrene, methacrylic acid, vinyl acetate, ethyl acrylate, isobutyl acrylate, and methyl vinyl ether.

The term "polyethylene" embraces polymer which is crosslinked and polymer which is substantially free of crosslinks. The term "crosslinked polyethylene" is limited to a polymer containing crosslinks. Crosslinks can be formed by any mechanism such as by use of irradiation or a peroxide crosslinking agent.

Low density polyethylene is used in the present invention because a composition including low density polyethylene exhibits on the order of at least a fortyfold increase in electrical endurance whereas the improvement, if any, exhibited by high density polyethylene is substantially less. "Low density" refers to a polyethylene which has a density up to about 0.92 g/cc; and "high density" refers to a polyethylene which has a density of more than about 0.94 g/cc. Medium density polyethylene exhibits less improvement in electrical endurance than is exhibited by low density polyethylene and more improvement than is exhibited by high density polyethylene. To the extent that medium density polyethylene exhibits any improvement, it is eligible for use in the composition of this invention. Reference is made to ASTM D 1248-74 for the terms "low density" and "high density".

The alcohol to be added to polyethylene in the present invention is an alcohol of 6 to 24 carbon atoms and preferably 8 to 12 carbon atoms. Preferred alcohols are aliphatic and monohydric. The alcohols can be either straight or branched chain. Suitable examples include n-hexyl, n-heptyl, n-octyl, n-decyl, n-dodecyl, n-tetradecyl, stearyl, and eicosyl alcohols, 2 decanol, 4-decanol, cyclohexanol, 3-methylheptanol-3, 2-methyloctanol-2,2-phenylpropanol-2, and the like. Benzyl alcohol is also eligible for use herein. The alcohols useful herein are also referred to in this specification as "tree growth inhibitors".

As employed in the present specification, the term "polypropylene" means a polymer conforming to the definition of "polypropylene plastics" in 1977 Annual Book of ASTM Standards, 1977, Part 36, page 72 as a plastic based on polymers made with propylene as essentially the sole monomer.

The alcohol and the polypropylene additives can be combined with the polyethylene by any conventional method, including mixing the additives with solid polyethylene prior to compounding and injecting the additives into molten polyethylene. Also, the alcohol could be diffused into a homogeneous solid blend of polypropylene and the polyethylene by spraying, soaking, or vapor contacting the solid blend with the alcohol.

A test method, denoted herein as Test Method I, is used for determining whether the presence of polypropylene adversely affects the electrical endurance of the composition. The procedure for Test Method I will be described herein.

The alcohol is generally added to a composition which includes low density polyethylene in an amount adequate to impart at least a fortyfold increase in the time to failure as determined by Test Method I and that amount is referred to herein as "an effective amount".

An effective amount of alcohol is from about 0.1 to about 7 and preferably from about 0.5 to about 5 weight percent of the low density polyethylene in such a composition.

While greater concentrations of alcohol can be employed, it is recognized that additives can increase the power factor of the polyethylene and an excess should not be employed where an increased power factor would be detrimental, for example, in insulation for high voltage transmission lines. In such a use, the insulating composition will have a power factor not greater than 1 percent and preferably not greater than 0.5 percent.

A test method, denoted herein as Test Method II, is used for determining the degree of mitigation of migration of the alcohol in the polyethylene.

The polypropylene is generally added to the composition of low density polyethylene and alcohol additive in an amount adequate to have a substantial effect in mitigating exudation of the alcohol additive and, thereby, to have a substantial effect in mitigating the tendency for pellets of the composition to agglomerate or clump together. The effect in mitigating exudation of the alcohol is measured by Test Method II, described hereinbelow. Too little polypropylene will be ineffective to adequately mitigate exudation of the alcohol and too much will alter the physical properties of the composition limiting its use as an insulation material. An effective amount of polypropylene has been found to be from about 1 to about 10 and preferably from about 2.0 to about 5 weight percent of the polyethylene in the composition.

The polyethylene and the polypropylene in the blend can be crosslinked by any conventional means. Conventional peroxide crosslinking agents can be employed, examples of which include: dialpha-cumyl peroxide; 2,5-bis(t-butyl peroxy-2,5-dimethyl)hexane; 2,5-dimethyl-2,5-di(t-butyl peroxy) hexyne-3; and the like.

Peroxide crosslinking agents which are soluble in the alcohol can be dissolved in the alcohol and added, in solution, to the blend of polyethylene and polypropylene. The blend of insulation material containing alcohol and crosslinking agent is not usually crosslinked until after the forming step for the insulation, such as, until after the blend has been formed into an insulating sheath for an electrical conductor.

Without intending to be bound by any theory concerning the function of any additive in the composition of this invention, the following is believed to explain the operation of the composition as it serves as insulator under conditions of high voltage. Tree growth in insulation is initiated by electrical discharge from a void or a site of contamination. A microchannel is started in the insulation at the point of the initial discharge and the microchannel is lengthened and branched in tree-like appearance on the occasion of each new electrical discharge. The microchannels provide avenues of reduced resistance for discharge and the tree will continue to grow until electrical failure occurs in the insulation. Addition of an alcohol, as specified in the invention, yields a reduced rate of tree growth because those alcohols have the ability to diffuse through polyethylene and into microchannel voids. When the voids contain alcohol, continued electrical discharge is impeded and tree growth is, consequently, inhibited.

The ability of the alcohol to diffuse through polyethylene and fill voids also gives rise to a problem of exudation of the alcohol onto the surface of the polyethylene causing the surface to be slippery and wet and, in the case of pellets of insulation material, causing the pellets to clump together and become cumbersome to handle. To mitigate the ability for the alcohol to diffuse might correct the problem of exudation, but that would be expected to also decrease any improvement in electrical endurance realized by virtue of the diffusion. When a small amount of polypropylene is blended with the polyethylene, it has now been shown that the exudation of alcohol is mitigated and, quite surprisingly, the increased electrical endurance is not diminished. The manner in which the polypropylene affects this improvement is not understood.

The following test methods are intended to imitate actual conditions of storage and use to provide indication of the operation of the composition of this invention compared with compositions of the prior art.

In practice, trees are initiated in power cables during high voltage surges caused by switching transients, lighting bolts and the like. Thereafter, tree growth and insulation failure can occur under normal operating stress. Test Method I is intended to cause initiation and growth of trees under controlled conditions but in a manner similar with the initiation and growth found in practice.

TEST METHOD I

Polyethylene for testing in accordance with this method is initially molded into a block herein termed a "SPING" (which is an acronym for "solid phase internal needle gap specimen"). A SPING is 25 mm square by 6 mm thick and contains two electrodes embedded lengthwise and in line, equidistant from the faces and from the opposite edges, with the tips spaced 4 mm apart at the center of the block. Each electrode is about 30 mm in length and about 0.6 mm in diameter. One electrode has a cone-shaped point at a 30° included angle with a radius of 5 $\mu$m and is the high voltage electrode. The second electrode has a 0.3 mm hemispherical radius on one end and is the ground electrode.

A minimum of five SPINGS are placed on test at the same time. Each SPING is placed under silicone oil, thus, preventing surface flashover. The high voltage electrode is connected to a high voltage bus and the ground electrode is connected to a spaced pair of 6.25 centimeter spheres connected to ground through a 1 megohm resistor. A gap is set sufficiently wide between the spheres to achieve a voltage sufficient to initiate a tree in the SPING. For example, with the spheres set at 0.762 centimeter gap, a voltage (60 HZ) increasing at a rate of 500 volts/sec is applied until a discharge occurs between the two spheres. Before this breakdown occurs, the stress on the specimen is essentially zero; however, the instant the air gap breaks down, the applied voltage plus a radio frequency signal developed by the arc is impressed across the specimen electrodes and is maintained for 1 to 5 seconds, so that a tree is initiated. The voltage required to initiate a tree will vary with the composition being tested. For polyethylene which contains polypropylene and an alcohol in accordance with the present invention, a voltage of 35 to 40 kv is required which is the same as with a composition of polyethylene with alcohol alone. For polyethylene which contains other additives, the voltage required may be higher or lower, but the voltage to be used is easily determined by visual examination of each specimen to see whether a tree has been initiated.

After the tree has been initiated, the SPING is held without application of voltage for about 6 days and then 12,000 volts is applied between the electrodes (an average applied voltage of 3000 v/mm). The time in hours necessary for the middle sample to fail (that is, third out of five, fifth out of nine, and so forth, in terms of time to failure) is measured and that time is called electrical endurance.

Failure is indicated by dielectric breakdown. When failure occurs, a tree has connected the two electrodes resulting in a sudden increase in current which trips a relay that in turn terminates the test on that specimen and produces a signal on an event recorder.

Insulation material is manufactured in the form of pellets and the pellets are shipped to makers of electrical cable for forming into continuous insulation sheathing. The pellets are shipped and stored under a variety of conditions ranging from −30° to 60° C. and in completely uncontrolled humidity. Test Method II is intended to cause exudation of alcohol and clumping and agglomeration of pellets under controlled conditions but in a manner similar with the occurrence in actual practice.

TEST METHOD II

Homogeneous polyethylene compositions for testing in accordance with this method are extruded into cylindrical pellets about 3 mm in diameter and approximately 4 mm long. Pellets so extruded can be subjected to the test method immediately after being extruded but it is preferable that the pellets should be aged at room temperature (about 18°–20° C.) and at about 50 percent relative humidity for about ten days before testing. The aging period is believed to yield test results which are more consistent from sample to sample.

To perform the test, 100 grams of the pellets to be tested are placed in a container and heated at 40° C. for 96 hours. At the end of that time, the pellets are washed with a solvent to separate the alcohol additive which was exuded from the pellets. It has been determined that the additive is adequately separated by agitating the pellets for one minute with 150 milliliters of methanol at a temperature of about 20° C.

The concentration of additive in the methanol is determined by well-known means, such as by gas chromatography. Using gas chromatography, it has been determined that representative suitable conditions include a sample injection temperature of about 200° C. with helium carrier gas at a flow of 30 milliliters per minute through a stainless steel column about 2 meters long and 0.32 centimeters in diameter with a packing of 15 weight percent of a nitrophthalate derivative of 20,000 molecular weight polyethylene glycol known, to gas chromatographers, as FFAP, on a diatomaceous earth support having a 60/80 mesh particle size known as Chromosorb W. The column temperature was maintained at about 190° C. and the flame ionization detector temperature was about 225° C.

The exudation results of Test Method II can be reported as milligrams of alcohol additive exuded per gram of polyethylene. It has been determined that exudation of more than about 2.5 milligrams of the alcohol additive per gram of polyethylene pellets causes agglomeration of the pellets. An "effective amount" of polypropylene in the polyethylene composition is that amount which limits exudation of the alcohol additive to less than 2.5 milligrams of the alcohol per gram of the polyethylene under the conditions of Test Method II.

The effect of exudation on clumping or agglomeration of pellets of the polyethylene is not directly and quantitatively determinable due to the greatly variable size and shape of the pellets and conditions under which the pellets might be shipped and stored prior to use. Moreover, a quantitative and reproducible determination of the degree of pellet clumping or agglomeration has been very difficult to develop. Exudation can be determined and the degree of exudation has been related to the tendency for the pellets of polyethylene to clump and agglomerate and, thereby, become difficult to handle.

Although the present invention includes a blended composition of polyethylene, polypropylene, and an alcohol, it is understood that other conventional additives can be and are normally present in the composition. These additives include antioxidants, for example, polymerized trimethyldihydroquinone; lubricants, for example, calcium stearate; pigments, for example, titanium dioxide; fillers, for example, glass particles; reinforcing agents, for example, fibrous materials such as asbestos and glass fibers; and the like. The only requirement for eligibility of other additives is that the other additives must be of a kind which will not adversely affect the electrical characteristics of the insulation.

Although an insulation of the composition of this invention is particularly suitable for power cable carrying high voltage such as 15 to 220 kv, it is likewise suitable for cables of lower or higher voltage applications. In electrical cable, in conformance with prior art teachings, a semiconducting layer would be interspaced between an electrical conductor and an insulating layer. Such semiconductor layer conventionally includes an insulating composition which also contains carbon black.

DESCRIPTION OF THE PREFERRED EMBODIMENTS

Example 1

A resin mixture of about 97 weight percent polyethylene and about 3 weight percent dodecanol was melt blended with a series of different amounts of polypropylene to yield a series of homogeneous insulating compositions having a range of polypropylene additive concentrations from 1 to 8 weight percent. A composition with no polypropylene was used as a control.

Each of those compositions was extruded into pellets about 3 millimeters in diameter and 4 millimeters in length and the pellets were stored in closed containers at room temperature (about 20° C.) for about 10 days.

Several 100 gram samples of each of the compositions were stored in individual containers and were heated at 40° C. After time periods of 48, 96, 192, and 360 hours, the exuded additive was separated using methanol, as was previously described under Test Method II, and the concentration of the additive was determined, also as was previously described under Test Method II.

Results of those exudation tests are presented in the following table and are also graphically presented in the FIGURE.

| Weight percent polypropylene | Time (hours) for Exudation | | | | |
|---|---|---|---|---|---|
| | 0 | 48 | 96 | 192 | 360 |
| 0 | 2.02 | 2.66 | 3.17 | 3.26 | — |
| 1 | *1.69 | 2.70 | — | 3.60 | 3.84 |
| 2 | 1.59 | 2.19 | — | 2.67 | 2.82 |
| 3 | 1.37 | 1.85 | 2.14 | 2.40 | — |
| 4 | 1.32 | 1.78 | 2.12 | 2.44 | 2.71 |
| 5 | 1.22 | 1.75 | 2.20 | 2.33 | 2.77 |
| 6 | 1.23 | 1.73 | 1.98 | 2.29 | 2.60 |
| 8 | 1.08 | 1.44 | 1.79 | 2.02 | 2.38 |

Entries in the table are milligrams of exuded additive per gram of polyethylene.
*Test values for 1 weight percent polypropylene are unexpectedly high and suggest an error in sample preparation.

The polyethylene of these tests was of a high molecular weight, had a density of 0.92 grams/cubic centimeter, and exhibited a melt index of 0.3 grams per 10 minutes when tested under the conditions specified in ASTM D-1238.

The polypropylene was a homopolymer with a density of 0.90 grams per cubic centimeter and exhibiting a melt flow rate of 0.8 grams per 10 minutes when tested under the conditions of ASTM D-1238.

While the test values are subject to some experimental error, reference to the FIGURE provides indication of the effective amount of polypropylene for the materials of this Example. The 96-hour curve represents results of Test Method II; and 2 weight percent is the lowest concentration of polypropylene which will yield adequate mitigation of exudation.

Example 2

To demonstrate that the presence of the polypropylene does not adversely affect the electrical endurance of the polyethylene/additive composition of this invention, a master batch was made of 97 weight percent of polyethylene and 3 weight percent of polypropylene. To a portion of the master batch was added 0.3 weight percent dodecanol, to another portion was added 0.5 weight percent dodecanol, and a remaining portion was used with no dodecanol. The materials used in this example were the same as those used in Example 1. However, for 0.5 percent dodecanol, Second Series, an individual composition was made up using the same polypropylene and polyethylene with a density of 0.92 grams per cubic centimeter and a melt index of 0.20 grams per 10 minutes.

The three portions were tested in accordance with Test Method I and yielded the results listed in the table below:

| Dodecanol (weight percent) | Electrical Endurance (hours to breakdown) |
|---|---|
| 0 (Control) | |
| First Series | 29 |
| Second Series | 41 |
| 0.3 | >1000 (test stopped without failure) |
| 0.5 (First Series) | 627 *(as of noon |
| 0.5 (Second Series) | 627 *Aug. 6, 1979) |

*These tests were still underway at the time of filing this application. If the tests have yielded no result at 1000 hours, they will be stopped.

It should be noted that, if failure is going to occur, experience has shown that it will most generally occur before 48 hours. If a sample survives the test for longer than 48 hours, experience has shown that it will generally last well over 1000 hours.

As an additional showing that the presence of polypropylene does not reduce the effect of the alcohol additive, two compositions of about 97 weight percent polyethylene and about 3 weight percent dodecanol were made; and, to one of the compositions, was added about 3 weight percent polypropylene. Both of these compositions were put onto test under conditions even more stringent than the conditions of Test Method I (wherein the test elelctrode tips were spaced 2 millimeters apart instead of 4 millimeters apart). Neither of the tests had ended after more than 1000 hours, thus indicating that the presence of the polypropylene had not seriously altered the electrical endurance of the insulation composition.

We claim:

1. A composition of matter consisting essentially of a homogeneous combination of:
   (a) polyethylene;
   (b) monohydric alcohol of 6 to 24 carbon atoms in an amount of 0.1 to 7 weight percent of the polyethylene; and
   (c) polypropylene in an amount effective to mitigate exudation of the alcohol from the polyethylene as measured by Test Method II.

2. A composition of matter consisting essentially of:
   (a) polyethylene;
   (b) polypropylene in an amount of 1 to 10 weight percent of the polyethylene;
   (c) monohydric alcohol of 6 to 24 carbon atoms in an amount capable of introducing at least a forty-fold increase in electrical endurance of the polyethylene as measured by Test Method I.

3. An article comprising an electrical conductor and an insulating layer consisting essentially of
   (a) polyethylene;
   (b) monohydric alcohol of 6 to 24 carbon atoms in an amount of 0.1 to 7 weight percent of the polyethylene;
   (c) polypropylene in an amount effective to mitigate exudation of the alcohol from the polyethylene as measured by Test Method II.

4. An article comprising an electrical conductor and an insulating layer consisting essentially of:
   (a) polyethylene;
   (b) polypropylene in an amount of 1 to 10 weight percent of the polyethylene;
   (c) monohydric alcohol of 6 to 24 carbon atoms in an amount capable of introducing at least a forty-fold increase in electrical endurance of the polyethylene as measured by Test Method I.

5. An article comprising an electrical cable and an insulating layer consisting essentially of:
   (a) polyethylene;
   (b) monohydric alcohol of 6 to 24 carbon atoms in an amount of 0.1 to 7 weight percent of the polyethylene; and
   (c) polypropylene in an amount effective to mitigate exudation of the alcohol from the polyethylene as measured by Test Method II.

6. An article comprising an electrical cable and an insulating layer consisting essentially of:
   (a) polyethylene;
   (b) polypropylene in an amount of 1 to 10 weight percent of the polyethylene;
   (c) monohydric alcohol of 6 to 24 carbon atoms in an amount capable of introducing at least a forty-fold increase in electrical endurance of the polyethylene as measured by Test Method I.

7. A free-flowing pelletized composition consisting essentially of:
   (a) polyethylene;
   (b) monohydric alcohol of 6 to 24 carbon atoms in an amount of 0.1 to 7 weight percent of the polyethylene; and
   (c) polypropylene in an amount effective to mitigate exudation of the alcohol from the polyethylene as measured by Test Method II.

* * * * *